United States Patent [19]
Nohava et al.

[11] 3,857,584
[45] Dec. 31, 1974

[54] TRICYCLE ANTITIPPING DEVICE

[76] Inventors: Theodore J. Nohava, 1102 Jefferson St.; David C. Girsh, 940 N.E. 170 St., Apt. 104, both of North Miami Beach, Fla. 33020

[22] Filed: Sept. 10, 1973

[21] Appl. No.: 395,702

[52] U.S. Cl. .............................. 280/293
[51] Int. Cl. .............................. B62h 7/00
[58] Field of Search ....... 280/205, 293, 295; 272/73

[56] References Cited
UNITED STATES PATENTS

| | | | |
|---|---|---|---|
| 585,590 | 6/1897 | Pallen | 280/293 |
| 1,761,679 | 6/1930 | Quickert | 280/295 |
| 2,449,024 | 9/1948 | Troendle | 280/293 X |
| 3,485,507 | 12/1969 | Christof | 280/293 |

Primary Examiner—David Schonberg
Assistant Examiner—Terrance L. Siemens

[57] ABSTRACT

This tricycle consists primarily of a U-shaped tubular member carried above the fork of the front wheel, the ends serving as stop means on the ground surface so as to prevent tipping of the forward portion of the tricycle when the rear safety member consisting of a tubular member having leg portions fastened at the rear and the end portions of the tubular member at the rear extend over the rear wheels so as to serve as stop means against the ground to prevent tipping of the rear end of the tricycle.

1 Claim, 2 Drawing Figures

TRICYCLE ANTITIPPING DEVICE

This invention relates to manually operated vehicles and more particularly to a tricycle.

It is therefore the principal object of this invention to provide a tricycle which will be safe in operation by having means so as to enable the tricycle to not tip over when a child is riding it, thus preventing possible injury to the rider.

Another object of this invention is to provide a tricycle which will have a steel tubular member of U-shaped configuration which will be mounted to the sleeve portion of the fork of the front wheel so as to prevent tipping of the forward end of the tricycle.

Still another object of this invention is to provide a tricycle which will include a tubular member at the rear having leg support portions being secured over the axle portion of the tricycle and the ends of the rear tubular member will extend over the rear wheels so as to provide stop means against tipping of the rear end of the tricycle.

Other objects of the invention are to provide a tricycle which is simple in design, inexpensive to manufacture, rugged in construction, easy to use and efficient in operation.

These and other objects will become readily evident upon a study of the following specification together with the accompanying drawing wherein.

Figure 1:
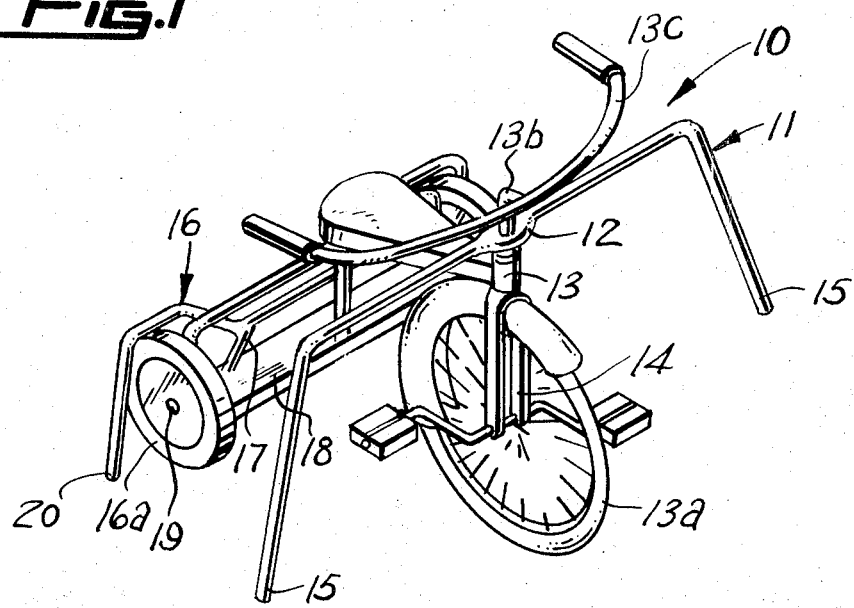
FIG. 1 is a perspective view of the present invention.
Figure 2:
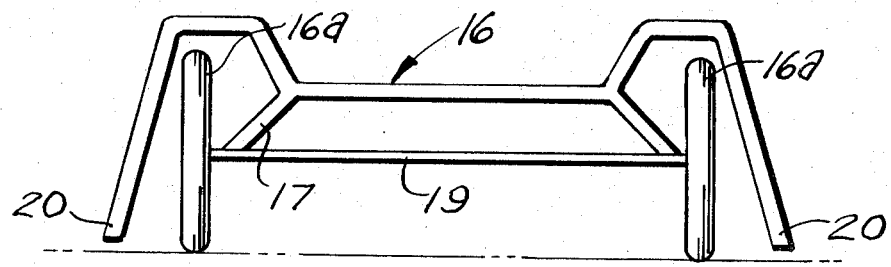
FIG. 2 is a horizontal view of the rear axle portion of the invention, showing the rear tubular member.

According to this invention, a tricycle 10 is shown to include a U-shaped configurated steel tube 11 having a central flange 12 which is fastened over the sleeve 13 of the fork 14 carrying the front wheel 13a. The tube 11 is carried upon the goose-neck 13b which carries the handlebar 13c.

The ends 15 of tubular member 11 extends downwards and are equally spaced on either side of wheel 13a and serve as stop means upon the ground when the rider accidentally starts the tricycle 10 into a tilting manner either right or left.

The tubular member 16 of steel is provided with legs 17 which are secured fixedly to step 18 over the axle 19 carrying the rear wheels 16a. The end portions 20 of tubular member 16 serve the same purpose as those of the ends 15 of tubular member 11 at the forward end of tricycle 10 and the ends 20 extend over the rear wheels 16a.

It shall be noted that the tubular members 11 and 16 are adaptable so as to fit tricycles that are standard in the art.

What I now claim is:

1. A tricycle comprising a U-shaped tubular member with mounting means for placement over a front wheel of a tricycle, a rear tubular member carried by said tricycle providing excessive non-tipping means for a rear end of said tricycle, said tubular member having mounting means for a front end of said tricycle and including a central flange member which receives a goose-neck portion of a handle bar of said tricycle and which extends from a sleeve of a fork carrying a front wheel of said tricycle; opposite end portions of said tubular member being angled outwards on each side of said front wheel so as to provide stop means against a ground when said tricycle starts to tilt and said front U-shaped tube acting in conjunction with said rear tubular member to prevent said excessive tipping, said rear tube member having leg means secured fixedly to a rear portion over an axle carrying said rear wheels, said rear tubular member including outwardly extending and over hanging opposite ends, said over hanging ends extending over said rear wheels, said ends being angled downwardly outwardly and spaced apart from side faces of said rear wheels in order to provide stop means upon a ground when said tricycle starts in to a tilt.

* * * * *